US010192447B2

(12) United States Patent
Kurata (10) Patent No.: US 10,192,447 B2
(45) Date of Patent: Jan. 29, 2019

(54) INTER-VEHICLE INFORMATION SHARING SYSTEM

(71) Applicant: SUZUKI MOTOR CORPORATION, Hamamatsu-Shi, Shizuoka (JP)

(72) Inventor: Koji Kurata, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 48 days.

(21) Appl. No.: 15/453,998

(22) Filed: Mar. 9, 2017

(65) Prior Publication Data
US 2017/0270801 A1 Sep. 21, 2017

(30) Foreign Application Priority Data
Mar. 18, 2016 (JP) ................. 2016-055696

(51) Int. Cl.
| | |
|---|---|
| *G08G 1/00* | (2006.01) |
| *G08G 1/01* | (2006.01) |
| *H04L 29/08* | (2006.01) |
| *G06F 3/14* | (2006.01) |
| *G06K 9/00* | (2006.01) |
| *G08G 1/0967* | (2006.01) |
| *G01C 21/36* | (2006.01) |
| *G01S 7/00* | (2006.01) |

(Continued)

(52) U.S. Cl.
CPC ............. *G08G 1/20* (2013.01); *G01C 21/36* (2013.01); *G01C 21/3602* (2013.01); *G01S 7/003* (2013.01); *G01S 7/022* (2013.01); *G01S 7/4806* (2013.01); *G01S 13/86* (2013.01); *G01S 13/931* (2013.01); *G06F 3/14* (2013.01); *G06K 9/00791* (2013.01); *G08G 1/0112* (2013.01); *G08G 1/09675* (2013.01); *G08G 1/096716* (2013.01); *G08G 1/096741* (2013.01); *G08G 1/096791* (2013.01); *G08G 1/22* (2013.01); *H04L 67/12* (2013.01); *G01S 13/862* (2013.01); *G01S 13/867* (2013.01); *G01S 2013/936* (2013.01); *G01S 2013/9325* (2013.01); *G05D 1/0088* (2013.01); *H04W 84/005* (2013.01); *H04W 84/18* (2013.01)

(58) Field of Classification Search
CPC .. G08G 1/20; G08G 1/0112; G08G 1/096716; G08G 1/096741; G01C 21/3626; G01C 21/3697; G01S 13/00; G06F 3/14; G06K 9/00791; G06T 7/00; G05D 1/0088; H04W 84/18; H04W 84/005; H04L 67/12
USPC .................................................. 701/36, 117
See application file for complete search history.

(56) References Cited

U.S. PATENT DOCUMENTS

| | | | |
|---|---|---|---|
| 8,774,837 B2* | 7/2014 | Wright ................. | G08G 1/0965 455/404.1 |
| 2006/0178788 A1* | 8/2006 | Sasaki .................... | G01C 21/26 701/1 |

FOREIGN PATENT DOCUMENTS

| | | |
|---|---|---|
| JP | 2013007632 A | 1/2013 |
| JP | 2013210979 A | 10/2013 |

* cited by examiner

*Primary Examiner* — Gertrude Arthur Jeanglaude
(74) *Attorney, Agent, or Firm* — Troutman Sanders LLP (57) ABSTRACT

Motorcycles in a group action share group information to which each of motorcycles belongs and the motorcycles share information with a surrounding four-wheeled vehicle via a vehicle-to-vehicle communication. The information to be shared is the group information. Information from the motorcycle to the four-wheeled vehicle is transmitted when the four-wheeled vehicle is detected by an imaging unit included in the motorcycle or transmitted when a detection unit irradiated from the four-wheeled vehicle is detected.

6 Claims, 7 Drawing Sheets

(51) Int. Cl.
*G01S 7/02* (2006.01)
*G01S 7/48* (2006.01)
*G01S 13/86* (2006.01)
*G01S 13/93* (2006.01)
G05D 1/00 (2006.01)
H04W 84/00 (2009.01)
H04W 84/18 (2009.01)

INTER-VEHICLE INFORMATION SHARING SYSTEM

CROSS-REFERENCE TO RELATED APPLICATIONS

This application is based upon and claims the benefit of priority of the prior Japanese Patent Application No. 2016-055696, filed on Mar. 18, 2016, the entire contents of which are incorporated herein by reference.

BACKGROUND OF THE INVENTION

Field of the Invention

The present invention relates to an information sharing system among vehicles where vehicles, especially motorcycles in a group action share group information, and further, share information with a four-wheeled vehicle nearby the group.

Description of the Related Art

As a case where a group of motorcycles travels toward an identical destination, for example, there is a case where members gather together to go touring. In the case, as a system that ensures convenience and safety by information sharing among the members, systems such as disclosed in Patent Document 1 and Patent Document 2 have been known.

For example, in the information sharing system disclosed in Patent Document 1, an information sharing server includes a group information storage unit, a second receiver, and a second transmitter. The group information storage unit stores identification information for each group to which occupants belong. The second receiver receives shared information. The second transmitter reads identification information of another portable information terminal in the group to which the identification information included in the received shared information belongs, so as to transmit the shared information to the read identification information as a destination.

Patent Document 1: Japanese Laid-open Patent Publication No. 2013-210979
Patent Document 2: Japanese Laid-open Patent Publication No. 2013-7632

However, in any case of a four-wheeled vehicle on a manned operation and a four-wheeled vehicle on an automatic operation, when the four-wheeled vehicle encounters motorcycles traveling around the own vehicle in group and wants to, for example, change a course depending on a traffic condition, the driver is sometimes lost for an accurate judgment without accurately obtaining group information of the motorcycles. Especially, in a case of the four-wheeled vehicle on the automatic operation, it is an operation performed by a machine while obtaining a condition around the own vehicle with a millimeter-wave radar and an imaging unit. Therefore, it is important for an accurate operation to obtain the surrounding condition further accurately and promptly compared with the case of the manned operation.

For example, in a case where a large vehicle travels forward, using a detection unit such as the millimeter-wave radar and the imaging unit often turns the condition ahead of the large vehicle into a blind spot. Therefore, it is not necessarily sufficient from the aspect of a preventive safety without accurately obtaining the condition of the place of the blind spot.

Further, a device and a system of a vehicle detection unit mounted on the four-wheeled vehicle are preferred to be simple as much as possible in consideration of cost or an arrangement space for the device and the system.

SUMMARY OF THE INVENTION

To solve the actual conditions, an object of the present invention is to provide an inter-vehicle information sharing system that has an excellent preventive safety and is feasible at a low cost.

The inter-vehicle information sharing system of the present invention is an information sharing system among vehicles where motorcycles in a group action share group information to which each of the motorcycles belongs and the motorcycles share information with a surrounding four-wheeled vehicle via a vehicle-to-vehicle communication, and the information to be shared is the group information.

In the inter-vehicle information sharing system of the present invention, information from the motorcycle to the four-wheeled vehicle is transmitted when the four-wheeled vehicle is detected by an imaging unit or an irradiated detection unit included in the motorcycle.

In the inter-vehicle information sharing system of the present invention, information from the motorcycle to the four-wheeled vehicle is transmitted when a detection unit irradiated from the four-wheeled vehicle is detected.

In the inter-vehicle information sharing system of the present invention, the four-wheeled vehicle is a vehicle on an automatic operation.

In the inter-vehicle information sharing system of the present invention, the motorcycles each share vehicle information of the four-wheeled vehicle.

DETAILED DESCRIPTION OF THE PREFERRED EMBODIMENTS

The following describes preferred embodiments in an inter-vehicle information sharing system according to the present invention based on the drawings.

Figure 1:
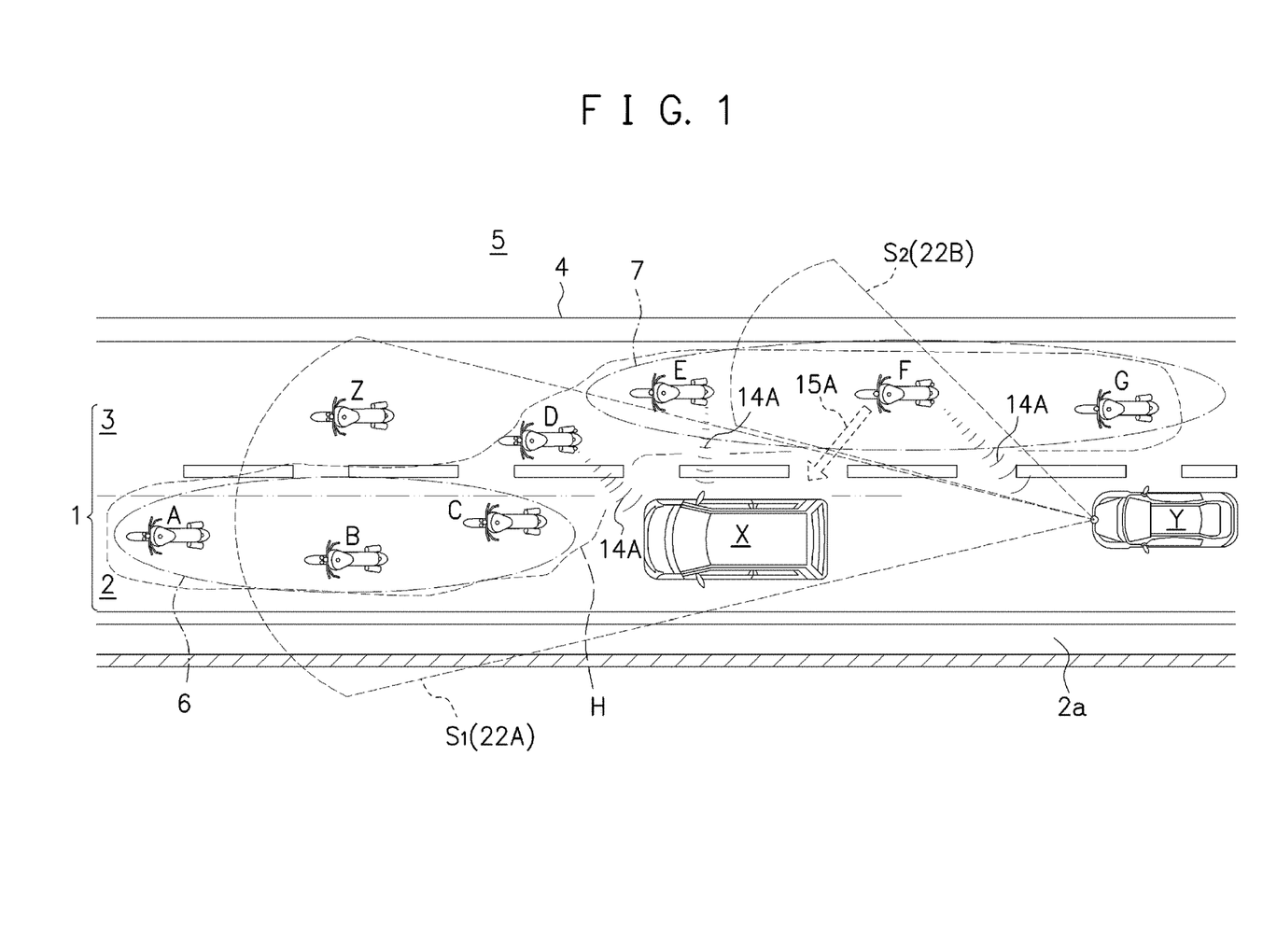
FIG. 1 is a drawing schematically illustrating an exemplary road condition to which an inter-vehicle information sharing system of the present invention is applied.

FIG. 1 illustrates an exemplary condition to which the inter-vehicle information sharing system according to the present invention is applied. In this example, for example, a case of a road 1 with two lanes on one side is employed as a road environment to which the present invention is applied, and the road 1 includes a driving lane 2 and a passing lane 3 prepared on a right side of the driving lane 2. On a left side of the driving lane 2, a road side belt 2a is disposed. An oncoming lane 5 is disposed across a center divider 4 from the road 1 with two lanes on one side. As the road environment, without limiting to this example, for example, the present invention is also applicable to a case of a road with three or more lanes on one side.

In FIG. 1, seven motorcycles A to G make a group (group H) and travel for a touring in a formation as an illustrated example. On surroundings of the motorcycles A to G in a group action, four-wheeled vehicles X, Y (a vehicle on a manned operation or a vehicle on an automatic operation) travel in parallel.

Figure 2:
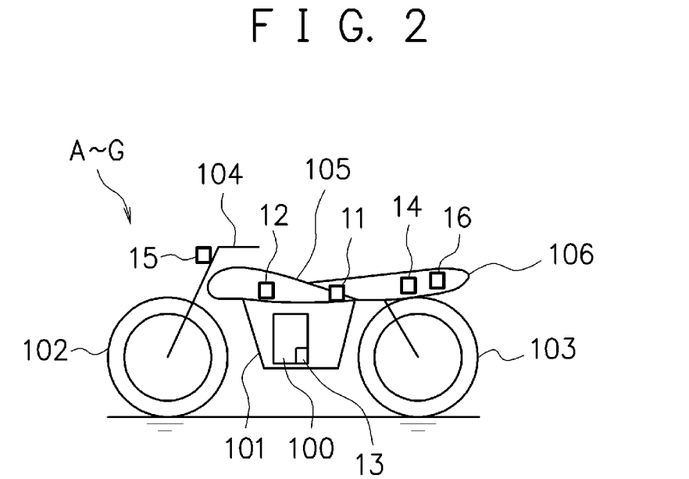
FIG. 2 is a vehicle side view schematically illustrating a schematic configuration of a motorcycle according to the inter-vehicle information sharing system of the present invention.

Here, as schematically illustrated in FIG. 2, the motorcycles A to G may be each typically saddle-ride type vehicles that include an engine 100 mounted on a frame 101, a front wheel 102 and a rear wheel 103, a handlebar 104 for steering, a fuel tank 105, a seat 106 where a motorcycle rider is seated, and similar part.

Figure 3:
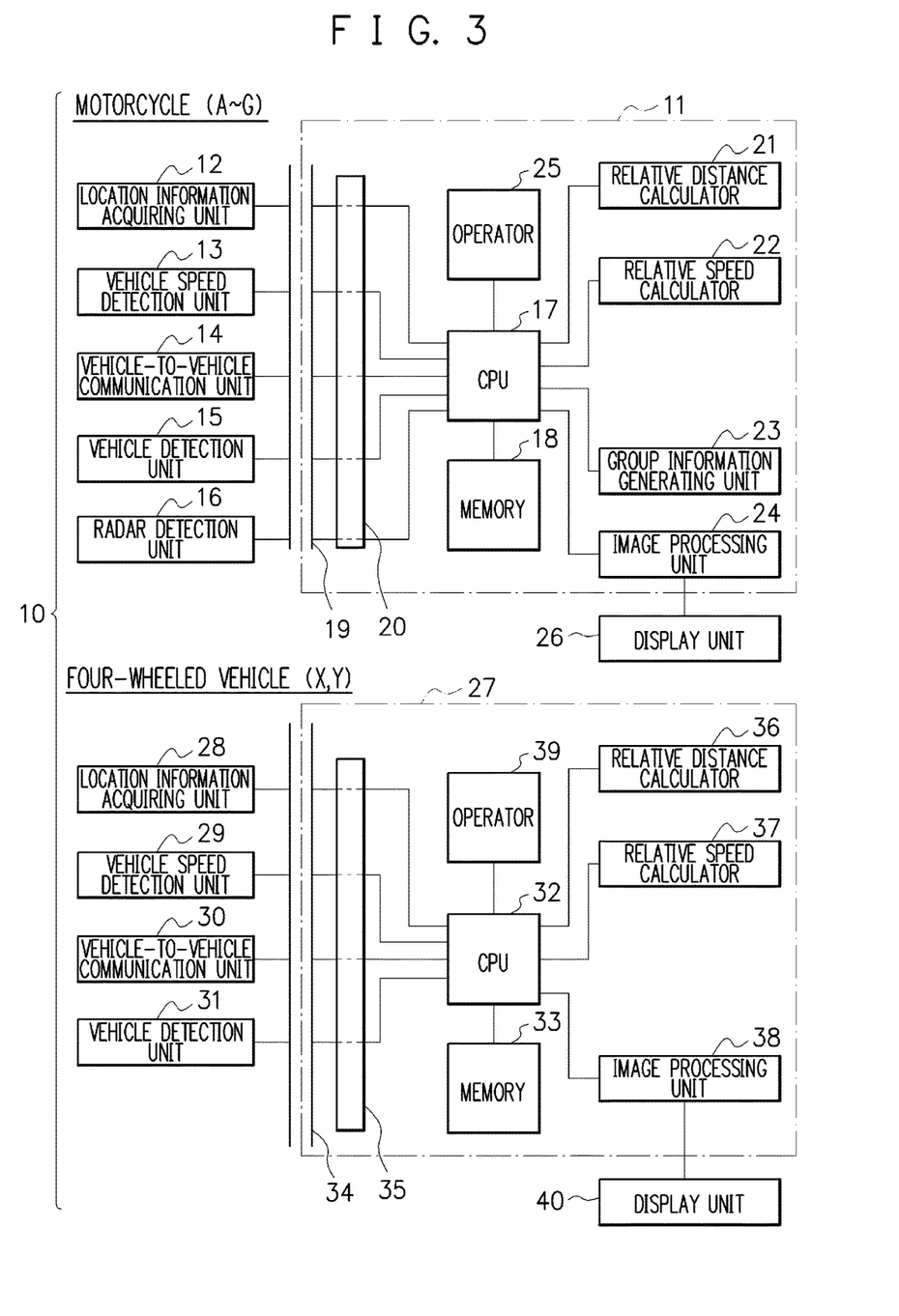
FIG. 3 is a block diagram illustrating a schematic configuration of the inter-vehicle information sharing system of the present invention.

With reference to FIG. 3, the motorcycles A to G further each include units or equipment (components) that constitute an inter-vehicle information sharing system 10 of the present invention, specifically, include an Electronic Control Unit (ECU) 11 as a control unit, a location information acquiring unit 12, a vehicle speed detection unit 13, a vehicle-to-vehicle communication unit 14, a vehicle detection unit 15 that performs such as a detection of vehicles existing around an own vehicle, a radar detection unit 16 that detects whether the own vehicle is detected by a radar, and similar unit. These components are disposed on predetermined positions of each of the motorcycles A to G as schematically illustrated in FIG. 2.

The ECU 11 is an electronic control unit and disposed such as a lower portion of the seat 106. The ECU 11 is configured including a CPU 17 that controls a performance of the entire inter-vehicle information sharing system 10, a memory 18 that stores various programs and data, an input and output interface 19, and similar part. Information obtained from the components is transmitted to the CPU 17 via a signal processing unit 20 that performs signal processes such as a conversion to data processable for the CPU 17. The ECU 11 further includes a relative distance calculator 21 and a relative speed calculator 22, further, a group information generating unit 23 and an image processing unit 24, and similar unit. The relative distance calculator 21 and the relative speed calculator 22 perform processes such as a calculation based on the information obtained from the components due to the CPU 17 executing the program stored in the memory 18. The group information generating unit 23 and the image processing unit 24 form group information of the entire group H. These units are coupled to the CPU 17, and the ECU 11 includes such as an operator 25 for executing the calculation process and similar process.

The location information acquiring unit 12 receives radio waves transmitted from a plurality of artificial satellites to obtain location information of the own vehicle. The location information acquiring unit 12 may be, specifically, a GPS receiver or similar device. While the location information acquiring unit 12 is disposed on such as surroundings of the fuel tank 105, the location information acquiring unit 12 may be disposed on any position insofar as a position where the radio waves are properly received from the artificial satellites. Radio wave information received by the GPS receiver is transmitted to the ECU 11, and the CPU 17 causes the operator 25 to constantly calculate the location information of the own vehicle varying from time to time during traveling.

The vehicle speed detection unit 13 detects a traveling speed of the own vehicle, and is configured of such as a rotation speed sensor that detects a rotation speed of the front wheel 102 of the own vehicle or a rotation speed of a drive sprocket disposed on an output end of a transmission gear. Vehicle speed information detected by such as the rotation speed sensor is transmitted to the ECU 11, and the CPU 17 causes the operator 25 to constantly calculate the vehicle speed of the own vehicle varying from time to time during traveling.

The vehicle-to-vehicle communication unit 14 communicates with the vehicle-to-vehicle communication units 14 mounted on vehicles (motorcycles A to G) other than the own vehicle. The vehicle-to-vehicle communication unit 14 is configured of such as a beacon (Beacon). While the vehicle-to-vehicle communication unit 14 may be disposed on such as surroundings of the seat 106, the vehicle-to-vehicle communication unit 14 may be disposed on any position insofar as a position where the communication can be properly performed. The vehicle-to-vehicle communication unit 14 includes a receiver that receives vehicle information from other motorcycles and a transmitter that transmits vehicle information of the own vehicle (own vehicle information). The vehicle information received by the receiver of the vehicle-to-vehicle communication unit 14 is transmitted to the ECU 11, while the own vehicle information generated in the ECU 11 is transmitted via the transmitter. Here, the vehicle information includes identification information of the vehicle, the location information of the vehicle, and similar information. The identification information is an ID unique to the vehicle, and the location information is a coordinate that indicates a current position of the vehicle. As the vehicle information, such as the vehicle speed is included.

The motorcycles A to G use the vehicle-to-vehicle communication unit 14 to directly or indirectly transmit and receive the vehicle information one another, so as to cause the group information generating unit 23 to form the group information as the vehicle information of all the group members in accordance with the program by the CPU 17. The group information generated in the group information generating unit 23 is stored in the memory 18, that is, the motorcycles A to G share the group information. This group information provides a total number of the motorcycles of the group H in the group action such as the touring, locations of a leading vehicle and a last vehicle of the group H, further, a location of the own vehicle in the group H, and similar information. The group information includes such as a length of the group calculated from the locations of the leading vehicle and the last vehicle of the group H.

The motorcycles A to G each use the vehicle-to-vehicle communication unit 14 to transmit the group information not only to the group members but also to the four-wheeled vehicles X, Y nearby the own vehicle (in FIG. 1, indicated as a vehicle-to-vehicle communication 14A).

The vehicle detection unit 15 is configured of an imaging unit that detects the existence of the four-wheeled vehicles X, Y nearby the own vehicle, typically, a camera (including such as an infrared camera), and takes images of sides of each of the motorcycles A to G, that is, a right side and a left side with respect to the traveling direction (in FIG. 1, indicated as a taking image 15A). The vehicle detection unit 15 is preferably disposed, for example, close to the front wheel 102 such that the motorcycle rider himself/herself does not cover the imaging unit (lens). The image information taken by the vehicle detection unit 15 is transmitted to the ECU 11 of the motorcycles A to G that have taken the image information. A number of the camera of the vehicle detection unit 15 is not limited to one, and the vehicle detection unit 15 may include cameras on the right side and the left side one by one, or one or more. Further, the vehicle detection unit 15 may take images of not only the side of the vehicle but also forward or rearward the vehicle.

The relative distance calculator 21 calculates relative positions and relative distances between the motorcycles A to G based on the location information of the respective motorcycles A to G obtained via the vehicle-to-vehicle communication unit 14. The location information of the location information acquiring unit 12 is obtained or detected in real-time, and as the relative position calculated by the relative distance calculator 21, the location information is not just inter-vehicle distances between the respective motorcycles A to G but includes information relating to directions to the motorcycles A to G one another on the current position. This indicates the motorcycles A to G to be each traveling the driving lane 2 or the passing lane 3 on the road 1.

The relative speed calculator 22 calculates the relative speed between the motorcycles A to G based on a temporal variation of the relative distances between the respective motorcycles A to G obtained by the relative distance calculator 21. The relative speeds of the surrounding motorcycles A to G with respect to the own vehicle also can be calculated based on the vehicle speed obtained by the vehicle speed detection unit 13 of the motorcycles A to G. When the relative distances between the own vehicle and the surrounding motorcycles A to G do not vary, the relative speeds are 0, that is, the surrounding motorcycles A to G are traveling at a speed identical to the own vehicle.

The group information generating unit 23 generates the group information as the vehicle information of all the group member based on the location information obtained by the relative distance calculator 21, the relative speed information obtained by the relative speed calculator 22, and similar information in accordance with the program by the CPU 17. This group information is shared as the group information such that information generated by any one of the motorcycles A to G is directly or indirectly transmitted and received among the motorcycles A to G via the vehicle-to-vehicle communication unit 14. Otherwise, the group information generating unit 23 of each of the motorcycles A to G can uniquely generate the group information.

The image processing unit 24 performs an image processing based on the group information obtained by the group information generating unit 23 to reproduce the group information as image information. A display unit 26 is disposed accompanying with the image processing unit 24 to provide the image information about the group information to the motorcycle rider. As the display unit 26, such as a display device that visualizes the group information may be employed, and the group information can be indicated on a monitor disposed accompanying with instruments such as a meter unit including such as a speed meter of the motorcycles A to G. The image information generated by the image processing unit 24 is also shared as the group information such that information generated by any one of the motorcycles A to G is directly or indirectly transmitted and received among the motorcycles A to G via the vehicle-to-vehicle communication unit 14. Otherwise, the motorcycles A to G can uniquely each generate the group information.

In the motorcycles A to G, further, when the radar detection unit 16, which has a radar detection function for detecting a radar wave or a laser irradiated from the four-wheeled vehicle, detects the radar wave or the laser irradiated from the four-wheeled vehicles X, Y, the detected signal is transmitted to the ECU 11. The ECU 11 can process the detected signal with the CPU 17 to specify a source of the radar wave or the laser, that is, to trace the source.

The CPU 17 further processes a detection signal of the radar detection unit 16 to indicate the image on the display unit 26. Then, the CPU 17 can be configured to inform the motorcycle rider of the motorcycles A to G, whose vehicle is irradiated with the radar, of the radar irradiation.

On the other hand, the four-wheeled vehicles X, Y each include units or equipment (components) that constitute the inter-vehicle information sharing system 10 of the present invention. Specifically, with reference to FIG. 3, the four-wheeled vehicles X, Y each include an ECU 27 as a control unit, a location information acquiring unit 28, a vehicle speed detection unit 29, a vehicle-to-vehicle communication unit 30, a vehicle detection unit 31 that performs such as a detection of the motorcycles A to G existing around the own vehicle, and similar unit.

These components are selectively equipped corresponding to whether the four-wheeled vehicles X, Y are the vehicles on the manned operation or the vehicles on the automatic operation. In the case where the four-wheeled vehicles X, Y are the vehicles on the manned operation, the vehicles include at least the vehicle-to-vehicle communication unit 30 and a display unit described later. In the case where the four-wheeled vehicles X, Y are the vehicles on the automatic operation, the vehicles preferably include all the components.

The ECU 27 is an electronic control unit and configured including a CPU 32, a memory 33 that stores various programs and data, an input and output interface 34, and similar part. Information obtained from the components is transmitted to the CPU 32 via a signal processing unit 35 that performs signal processes such as a conversion to data processable for the CPU 32.

The ECU 27 further includes a relative distance calculator 36 and a relative speed calculator 37, further, an image processing unit 38, and similar unit. The relative distance calculator 36 and the relative speed calculator 37 perform processes such as a calculation based on the information obtained from the components due to the CPU 32 executing the program stored in the memory 33. These units are coupled to the CPU 32, and the ECU 27 includes such as an operator 39 for executing the calculation process and similar process.

The location information acquiring unit 28 receives radio waves transmitted from a plurality of artificial satellites to obtain location information of the own vehicle. The location information acquiring unit 28 may be, specifically, a GPS receiver or similar device, and may be disposed on any position of the four-wheeled vehicles X, Y insofar as a position where the radio waves are properly received from the artificial satellites. Radio wave information received by the GPS receiver is transmitted to the ECU 27, and the CPU 32 causes the operator 39 to constantly calculate the location information of the own vehicle varying from time to time during traveling.

The vehicle speed detection unit 29 detects a traveling speed of the own vehicle, and is configured of such as a rotation speed sensor that detects a rotation speed of a wheel of the four-wheeled vehicles X, Y. Vehicle speed information detected by such as the rotation speed sensor is transmitted to the ECU 27, and the CPU 32 causes the operator 39 to constantly calculate the vehicle speed of the own vehicle varying from time to time during traveling.

The vehicle-to-vehicle communication unit 30 is configured to communicate with the vehicle-to-vehicle communication unit 14 mounted on the motorcycles A to G. The vehicle-to-vehicle communication unit 30 is configured of such as a beacon (Beacon), and may be disposed on any position of the four-wheeled vehicles X, Y insofar as a position where the communication can be properly performed. The vehicle-to-vehicle communication unit 30 includes at least a receiver that receives the vehicle information, the group information, and similar information from the motorcycles A to G. The information received by the vehicle-to-vehicle communication unit 30 is transmitted to the ECU 27 to be stored in the memory 33.

The vehicle detection unit 31 is configured of a radar device that detects the existence of such as the motorcycles A to G nearby the own vehicle, typically, a millimeter-wave radar or a laser radar. While the vehicle detection unit 31 detects a vehicle mainly ahead or obliquely ahead of the respective four-wheeled vehicles X, Y, with reference to FIG. 1, a radar wave 22A or a laser 22B irradiated from the vehicle detection unit 31 is detected by the radar detection unit 16 of the motorcycles A to G. Here, as illustrated in FIG. 1, a detection range of the millimeter-wave radar is indicated as a first radar wave detection range S1, and a detection range of the laser radar is indicated as a second radar wave detection range S2.

The relative distance calculator 36 calculates relative positions and relative distances with respect to the motorcycles A to G based on the location information (group information of the group H) of the respective motorcycles A to G obtained via the vehicle-to-vehicle communication unit 30. The location information of the location information acquiring unit 28 is obtained or detected in real-time, and as the relative position calculated by the relative distance calculator 36, the location information is not just inter-vehicle distances with respect to the motorcycles A to G but includes information relating to directions of the motorcycles A to G on the current position. This indicates the motorcycles A to G to be each traveling the driving lane 2 or the passing lane 3 on the road 1.

While the relative distance calculator 36 is disposed typically in the case of the vehicle on the automatic operation, the relative distance calculator 36 may be disposed on the vehicle on the manned operation as necessary.

The relative speed calculator 37 calculates the relative speed with respect to the motorcycles A to G based on a temporal variation of the relative distances with respect to the respective motorcycles A to G obtained by the relative distance calculator 36. The relative speeds of the surrounding motorcycles A to G with respect to the four-wheeled vehicles X, Y also can be calculated based on the vehicle speed obtained by the vehicle speed detection units 13 of the motorcycles A to G.

While the relative speed calculator 37 is disposed typically in the case of the vehicle on the automatic operation, the relative speed calculator 37 may be disposed on the vehicle on the manned operation as necessary.

The image processing unit 38 performs an image processing based on the group information of the group H obtained via the vehicle-to-vehicle communication unit 30 to reproduce the group information of the group H as image information. A display unit 40 is disposed accompanying with the image processing unit 38 to provide the image information about the group information to drivers of the four-wheeled vehicles X, Y. As the display unit 40, such as a display device that visualizes the group information of the motorcycles A to G may be employed, and the group information can be indicated on a monitor disposed accompanying with such as a meter panel of the four-wheeled vehicles X, Y.

The image processing unit 38 and the display unit 40 are disposed typically in the case of the vehicle on the manned operation.

Next, an exemplary operation of the inter-vehicle information sharing system 10 according to the present invention will be described with an example of FIG. 1. Here, the inter-vehicle information sharing system 10 of this embodiment is characterized by the following processes.

First, the motorcycles A to G in the group action each share group information of the group to which the motorcycles A to G belong, and share information with the surrounding four-wheeled vehicles X, Y via the vehicle-to-vehicle communication. The shared information is the group information.

In this case, the information from the motorcycles A to G is transmitted in the case where the imaging unit as the vehicle detection unit 15 included in the motorcycles A to G has detected the four-wheeled vehicles X, Y.

The information from the motorcycles A to G is transmitted in the case where the radar wave or the laser irradiated from the vehicle detection unit 31 of the four-wheeled vehicles X, Y has been detected.

Figure 4:
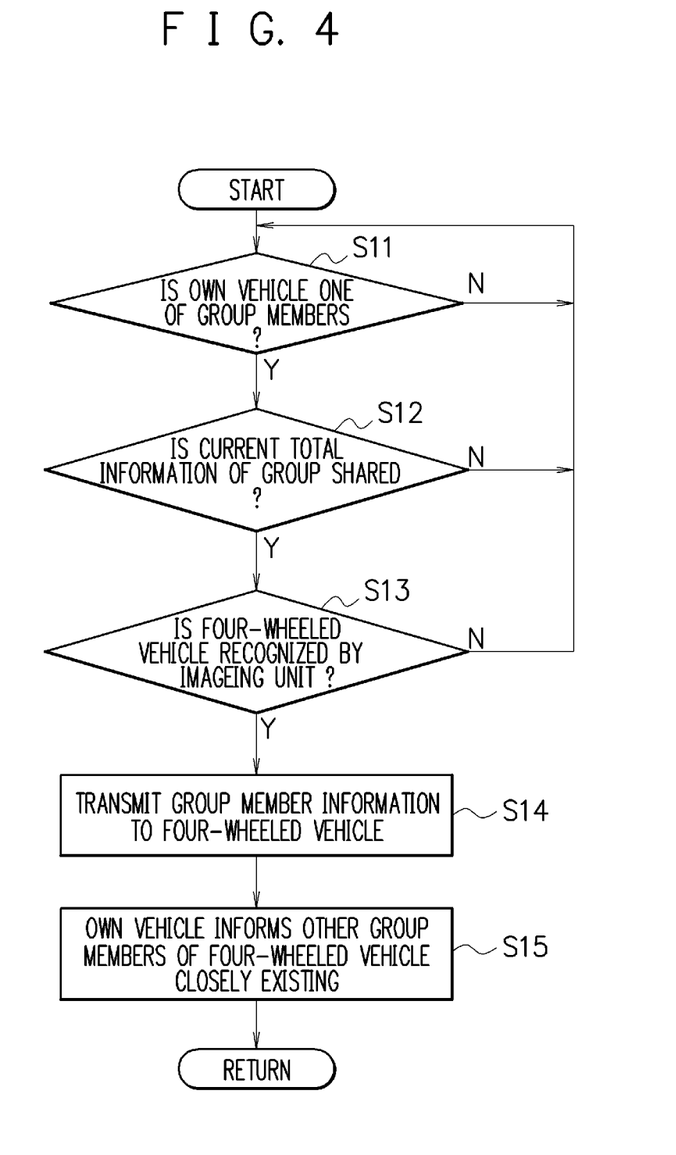
FIG. 4 is a flowchart illustrating an exemplary process of information sharing in the inter-vehicle information sharing system of the present invention.

The following describes a specific example of the process of the inter-vehicle information sharing system 10 of this embodiment with reference to a flowchart indicated in FIG. 4. The flowchart indicated in FIG. 4 is achieved by the execution of the programs stored in the memory 18 by the CPU 17 of the ECU 11. The ECU 11 constantly obtains the information from the GPS receiver of the location information acquiring unit 12, the vehicle speed detection unit 13, and similar unit.

First, in Step S11, the ECU 11 determines whether the own vehicle is one of the group members. In the case where the motorcycles A to G make the group H on such as the touring as this example, the group members each register their ID information in the memory 18 of the ECU 11 before or on departure for the touring. This ensures immediately confirming one another whether the own vehicle is one of the group members based on the ID information.

Next, in Step S12, when the motorcycles A to G are confirmed to be the group member in Step S11, the ECU 11 determines whether the group H shares total information of the current group H, that is, the group information. On the determination of sharing the group information, the ECU 11 of each of the motorcycles A to G transmits and receives the own vehicle information one another to obtain the own vehicle information one another via the vehicle-to-vehicle communication unit 14. In this case, for example, the process where vehicles adjacent to one another among the motorcycles A to G transmit and receive the own vehicle information one another via the vehicle-to-vehicle communication unit 14 is sequentially executed in a relay system. Exchanging the information owned by the own vehicle and the information owned by the other side one another ensures the motorcycles A to G to obtain the total information of the group H. For example, as the example illustrated in FIG. 1, even in the case where the direct transmitting and receiving via the vehicle-to-vehicle communication unit 14 is difficult such as the leading motorcycle A and the last motorcycle G in the group H, the total information of the group H can be indirectly exchanged to share among all the group members.

Next, in Step S13, when the motorcycles A to G share the group information in Step S12, the ECU 11 determines whether the four-wheeled vehicles X, Y exist in the surroundings. In this case, the ECU 11 uses the imaging unit as the vehicle detection unit 15 included in the motorcycles A to G to determine the existence of the four-wheeled vehicles X, Y. For example, as the example illustrated in FIG. 1, the motorcycle F among the motorcycles D, E, and F takes an image of the surrounding four-wheeled vehicle X (taking image 15A), and the CPU 17 of the ECU 11 performs an image processing of the taken image ensures detecting the existence of the four-wheeled vehicle X. The vehicle detection unit 15 that uses an ultrasonic sound wave effective for the detection at a short distance may be employed.

As the example illustrated in FIG. 1, in some cases, the motorcycles D, E nearby the four-wheeled vehicle X use the imaging unit to take the image of the four-wheeled vehicle X so as to detect the existence of the four-wheeled vehicle X. Otherwise, in the case where the four-wheeled vehicle Y exists, the surrounding motorcycle G uses the imaging unit to take an image of the four-wheeled vehicle Y so as to detect the existence of the four-wheeled vehicle Y.

Next, in Step S14, when the existence of the four-wheeled vehicles X, Y is determined in Step S13, the ECU 11 transmits the group information of the motorcycles A to G to the four-wheeled vehicles X, Y via the vehicle-to-vehicle communication unit 14. In this case, as the example illustrated in FIG. 1, the motorcycle F itself that has determined the existence of the four-wheeled vehicle X nearby the four-wheeled vehicle X transmits the group information of the motorcycles A to G, which has been already shared in Step S12, to the four-wheeled vehicle X via the vehicle-to-vehicle communication unit 14. The four-wheeled vehicle X obtains the group information of the motorcycles A to G transmitted from the motorcycle F via the vehicle-to-vehicle communication unit 30, so as to recognize the existence of the group H of the motorcycles A to G nearby the own vehicle. Thus the group information of the motorcycles A to G is shared by the whole including the four-wheeled vehicle X existing in the surroundings.

When the four-wheeled vehicle X is the vehicle on the manned operation, the group information of the group H of the motorcycles A to G is indicated on such as a monitor of the display unit 40. The driver of the four-wheeled vehicle X watches the display unit 40 to confirm the total condition of the group H of the motorcycles A to G.

Next, in Step S15, the motorcycle F, which has detected the four-wheeled vehicle X, informs the other group members of the four-wheeled vehicle X closely existing. In this case, the motorcycle F transmits the vehicle information of the four-wheeled vehicle X to, for example, the motorcycle E or the motorcycle G via the vehicle-to-vehicle communication unit 14. Then, the vehicle information of the four-wheeled vehicle X is shared among all the members of the group H of the motorcycles A to G similarly to the case performed in Step S12.

Thus having the information relating to the four-wheeled vehicle X approaching to the group H causes the motorcycles A to G to preliminarily prepare for a way to correspond to the four-wheeled vehicle X. This is extremely effective for ensuring safety.

In the above case, the group information of the motorcycles A to G can be provided to the four-wheeled vehicle X by another process. That is, such as the motorcycle D or the motorcycle E, which has obtained the vehicle information of the four-wheeled vehicle X from the motorcycle F, can transmit the group information of the motorcycles A to G to the four-wheeled vehicle X via the vehicle-to-vehicle communication unit 14.

Figure 5:
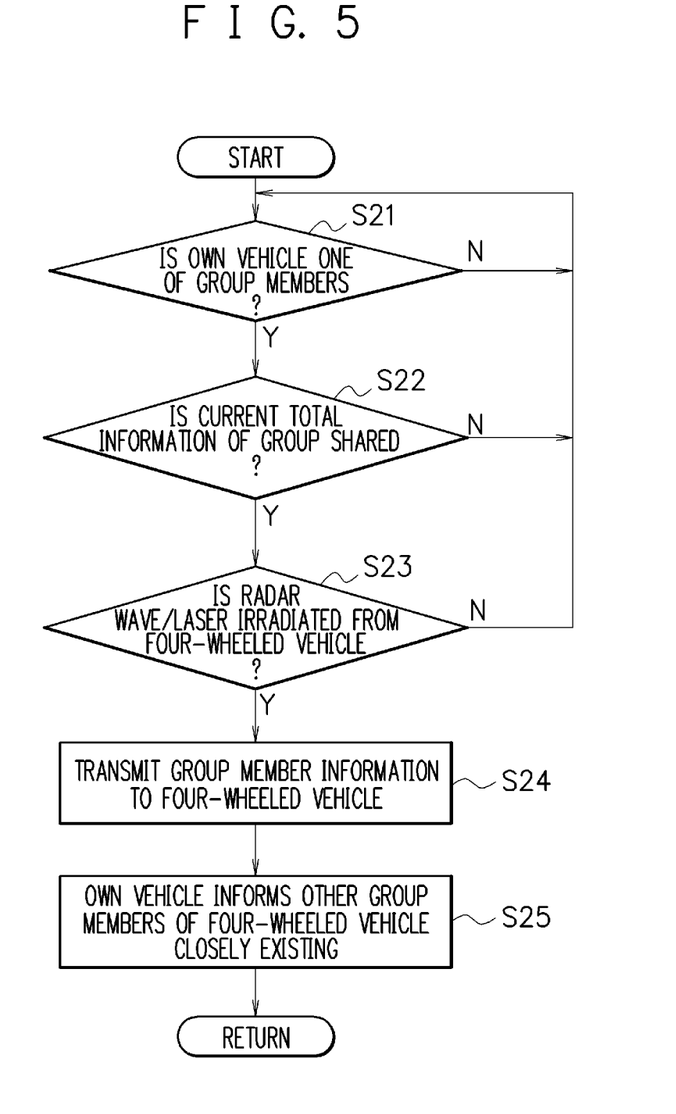
FIG. 5 is a flowchart illustrating another exemplary process of the information sharing in the inter-vehicle information sharing system of the present invention.

Here, a description will be given of the other specific example of the process of the inter-vehicle information sharing system 10 of this embodiment with reference to a flowchart indicated in FIG. 5. The flowchart indicated in FIG. 5 is achieved by the execution of the programs stored in the memory 18 by the CPU 17 of the ECU 11. The ECU 11 constantly obtains the information from the GPS receiver of the location information acquiring unit 12, the vehicle speed detection unit 13, and similar unit.

First, in Step S21, the ECU 11 determines whether the own vehicle is one of the group members. In the case where the motorcycles A to G make the group H on such as the touring as this example, the group members each register their ID information in the memory 18 of the ECU 11 before or on departure for the touring. This ensures immediately confirming one another whether the own vehicle is one of the group members based on the ID information.

Next, in Step S22, when the motorcycles A to G are confirmed to be the group member in Step S21, the ECU 11 determines whether the group H shares total information of the current group H, that is, the group information. On the determination of sharing the group information, the ECU 11 of each of the respective motorcycles A to G transmits and receives the own vehicle information to obtain the own vehicle information one another via the vehicle-to-vehicle communication unit 14. In this case, for example, the process where vehicles adjacent to one another among the motorcycles A to G transmit and receive the own vehicle information one another via the vehicle-to-vehicle communication unit 14 is sequentially executed in a relay system. Exchanging the information owned by the own vehicle and the information owned by the other side one another ensures the motorcycles A to G to obtain the total information of the group H. For example, as the example illustrated in FIG. 1, even in the case where the direct transmitting and receiving via the vehicle-to-vehicle communication unit 14 is difficult such as the leading motorcycle A and the last motorcycle G in the group H, the total information of the group H can be shared among all the group members.

Next, in Step S23, when the motorcycles A to G share the group information in Step S22, the ECU 11 determines whether the radar wave or the laser is irradiated from the vehicle detection unit 31 of the four-wheeled vehicles X, Y. For example, as the example illustrated in FIG. 1, assume that the four-wheeled vehicle Y (typically, the vehicle on the automatic operation) irradiates the laser 22B from the vehicle detection unit 31 to the motorcycle F traveling forward. The four-wheeled vehicle Y detects the existence of the motorcycle F by a reflected wave. On the other hand, the motorcycle F detects the laser 22B irradiated from the four-wheeled vehicle Y by the radar detection unit 16. In this case, the detection signal, which is received by the radar detection unit 16 of the motorcycle F among the motorcycles E, F, and G in the second radar wave detection range S2, is performed with the signal process by the CPU 17 of the ECU 11 of the motorcycle F. This ensures the existence of the four-wheeled vehicle Y to be detected.

Not limiting to the case of the example illustrated in FIG. 1, including a case where the radar wave or the laser is irradiated to any of the motorcycles A to G, in some cases, such as the motorcycles E, G coming into the second radar wave detection range S2 detect that the four-wheeled vehicle Y is irradiating the laser 22B.

Otherwise, in some cases, the motorcycles A to D traveling in the first radar wave detection range S1 of the millimeter-wave radar (this case, assume that there is no four-wheeled vehicle X ahead of the four-wheeled vehicle Y on the driving lane 2) detect that the four-wheeled vehicle Y is irradiating the radar wave 22A.

Next, in Step S24, when it is determined that the vehicle detection unit 31 of the four-wheeled vehicle Y has irradiated the radar wave or the laser in Step S23, the ECU 11 transmits the group information of the motorcycles A to G to the four-wheeled vehicle Y via the vehicle-to-vehicle communication unit 14. In this case, as the example illustrated in FIG. 1, the motorcycle F itself traveling forward the four-wheeled vehicle Y transmits the group information of the motorcycles A to G, which has been already shared in Step S22, to the four-wheeled vehicle Y via the vehicle-to-vehicle communication unit 14. The four-wheeled vehicle Y obtains the group information of the motorcycles A to G transmitted from the motorcycle F via the vehicle-to-vehicle communication unit 30, so as to recognize the existence of the group H of the motorcycles A to G forward or nearby the own vehicle. Thus the group information of the motorcycles A to G is shared by the whole including the four-wheeled vehicle Y existing in the surroundings.

When the four-wheeled vehicle Y is the vehicle on the automatic operation, the relative distance calculator 36 calculates the relative position and the relative distance with respect to each of the motorcycles A to G based on the group information of the group H of the motorcycles A to G, and further, the relative speed calculator 37 calculates the relative speed with respect to each of the motorcycles A to G based on the temporal variation of the relative distance with respect to each of the motorcycles A to G obtained by the relative distance calculator 36. The four-wheeled vehicle Y can continue the subsequent automatic operation while keeping such as appropriate inter-vehicle distances with respect to the motorcycles A to G based on the information relating to the relative distance and the relative speed.

Next, in Step S25, the motorcycle F, to which the radar wave or the laser has been irradiated from the four-wheeled vehicle Y, informs the other group members of the four-wheeled vehicle Y closely existing. In this case, the motorcycle F transmits the vehicle information of the four-wheeled vehicle Y to, for example, the motorcycle E or the motorcycle G via the vehicle-to-vehicle communication unit 14. Then, the vehicle information of the four-wheeled vehicle Y is shared among all the members of the group H of the motorcycles A to G similarly to the case performed in Step S22.

In the above case, with reference to FIG. 1, the motorcycle F exists within a range of the second radar wave detection range S2 of the four-wheeled vehicle Y. Here, in the radar detection to the motorcycles A to G, generally, the millimeter-wave radar passes through a resin portion and is attenuated at a rubber portion such as a tire, such that these portion have a property of a difficulty in capturing with radar. Since a side surface direction of the vehicle has a larger reflecting surface of the radar wave (especially, an area of a metal portion) compared with a front-rear direction, a possibility to be overlooked in the detection is decreased. Nearby the motorcycle F, the vehicle side surface is easily irradiated with the radar wave and ensures the larger reflecting surface compared with the vehicle front-rear direction, thus decreasing the possibility to be overlooked in the detection compared with the vehicle front-rear direction. Since the motorcycle F exists obliquely forward the four-wheeled vehicle Y, the motorcycle F is detected with a higher accuracy compared with the case where the laser 22B is irradiated from the vehicle front-rear direction.

Next, main advantageous effects or similar effects according to the inter-vehicle information sharing system 10 of the present invention will be described.

As the example of FIG. 1, the motorcycles A to G in the group action each share the group information, and the group information is provided to the surrounding four-wheeled vehicles X, Y to be shared.

The motorcycles A to G each obtain the total condition of the group H, to which each of the motorcycles A to G belongs, the position in the group H, and similar information to ensure performing the proper and smooth group action in the group H, and additionally, the surrounding four-wheeled vehicles X, Y can obtain the total condition of the group H of the motorcycles A to G. This prevents an unexpected behavior due to lack of information. Sharing information between the group H of the motorcycles A to G and the four-wheeled vehicles X, Y ensures and maintains the mutual high safety. For example, in the example of FIG. 1, the existence of the motorcycle F or the motorcycle G, which follow the motorcycle E traveling in parallel to the four-wheeled vehicle X, is recognized, thus ensuring the four-wheeled vehicle X to be prevented from an overlooking of the vehicles, a sudden lane change due to such as lack of confirmation, or such as a reckless passing. This is extremely effective to ensure the safety of both the motorcycles A to G and the four-wheeled vehicles X, Y.

In the case where the four-wheeled vehicles X, Y are especially the vehicles on the automatic operation, the inter-vehicle information sharing system 10 accurately obtains the surrounding condition of the own vehicle to contribute to a preventive safety even if the motorcycles A to G existing forward are in the blind spot. For example, as the example of FIG. 1, assume that the group H of the motorcycles A to G is traveling in the formation across the driving lane 2 and the passing lane 3 on the road 1. In this case, forward the four-wheeled vehicle X traveling ahead of the four-wheeled vehicle Y as the vehicle on the automatic operation, a blind spot area 6 is generated with respect to the four-wheeled vehicle Y due to the existence of the four-wheeled vehicle X, so as to cause the motorcycles A, B, and C in the blind spot area 6 to be undetectable by the millimeter-wave radar. Further, the motorcycles E, F, and G are traveling in a blind spot area 7 outside the first radar wave detection range S1.

Under this condition, the four-wheeled vehicle Y irradiates the laser 22B to, for example, the motorcycle F in the second radar wave detection range S2, and the motorcycle F transmits the group information of the motorcycles A to G to the four-wheeled vehicle Y via the vehicle-to-vehicle communication unit 14 (FIG. 5, Step S24). This ensures the four-wheeled vehicle Y to recognize the existence of the motorcycles A, B, and C in the blind spot area 6. Thus sharing the group information of the motorcycles A to G by the whole including the four-wheeled vehicle Y existing in the surroundings ensures the high safety even in the case under the driving condition with the blind spot.

In the case where the four-wheeled vehicle is especially the vehicle on the automatic operation, the vehicle is required to increase the number of the detection unit such as the millimeter-wave radar and the imaging unit to improve the performance for accurately obtaining the information of the quickly moving motorcycle. For example, the performance of the radar device is improved to prevent a detection omission of the motorcycle existing behind the vehicle where it is difficult for the radar wave to reach. According to the present invention, the group information obtained via the vehicle-to-vehicle communication unit 30 of the four-wheeled vehicles X, Y among the motorcycles A to G accurately and quickly provides the surrounding condition, thus ensuring obtaining the surrounding condition without increasing the number of the detection unit or similar unit. This substantially reduces the cost of the detection system.

In addition to the above description, the inter-vehicle information sharing system 10 of the present invention is effective in the case where a motorcycle other than the group members exists. For example, in the example illustrated in FIG. 1, assume that a motorcycle Z other than the group members are traveling in parallel near the leading vehicle of formation of the group H of the motorcycles A to G on the passing lane 3. While the motorcycle Z is not the group member, the motorcycle Z is recognized as a part of the traveling of the group members for the traveling of the four-wheeled vehicles X, Y side, so as to be easily recognized for the motorcycle Z compared with the case of a single action. The awareness of the group members leads to the awareness of the motorcycle Z as a result, thus adding the motorcycle Z to the group members to make a virtual group.

Further, the information is transmitted via the vehicle-to-vehicle communication to a vehicle without a system for detecting the vehicle with the millimeter-wave radar or the laser. The vehicle without the radar device can obtain the group information to ensure the effective use of the group information.

Figure 6:
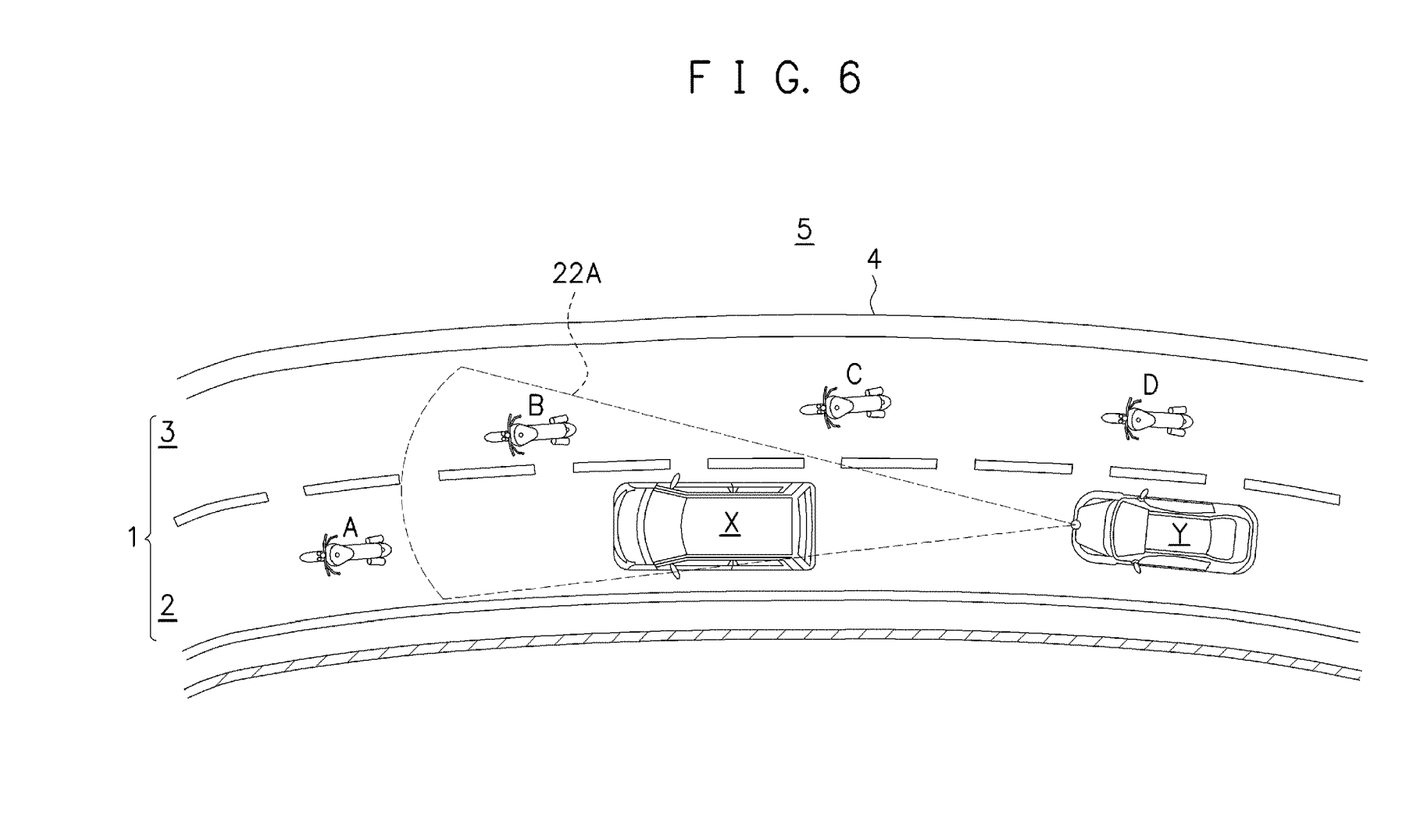
FIG. 6 is a drawing schematically illustrating another exemplary road condition to which the inter-vehicle information sharing system of the present invention is applied.

Here, a description will be given of an example of another condition to which the inter-vehicle information sharing system 10 according to the present invention is applied. FIG. 6 indicates an exemplary case where the road 1 with two lanes on one side including the driving lane 2 and the passing lane 3 curves. The oncoming lane 5 is disposed across the center divider 4 from the road 1 with two lanes on one side. On the road 1, for example, a plurality of the motorcycles A to D and the four-wheeled vehicles X, Y are traveling, and under the road condition where the motorcycle A, C, D, and similar vehicle enter to the blind spot area of the radar device of the four-wheeled vehicle Y due to the curve of the road 1, the information captured by the radar wave/the laser is generally decreased compared with the case of a straight road.

As this example, while the motorcycle B exists in the detection range of the radar wave 22A of the vehicle detection unit of the four-wheeled vehicle Y, the motorcycles A, C, and D other than the motorcycle B, especially, such as the leading motorcycle A are under the condition where it is difficult to be captured by the radar wave 22A. In this case, after the confirmation of the radar wave irradiated to the motorcycle B from the vehicle detection unit of the four-wheeled vehicle Y, for example, the motorcycle D transmits the group information shared among the motorcycles A to D to the four-wheeled vehicle Y. Then, the group information of the motorcycles A to D is shared by the whole including the four-wheeled vehicle Y existing in the surroundings.

Even under the condition of the curved road as this example, sharing the information between the group of the motorcycles and the four-wheeled vehicle in accordance with the inter-vehicle information sharing system of the present invention ensures and maintains the mutual high safety. The total condition of the group of the motorcycles can be obtained, so as to be extremely effective to ensure the safety of both the motorcycle and the four-wheeled vehicle.

Figure 7:
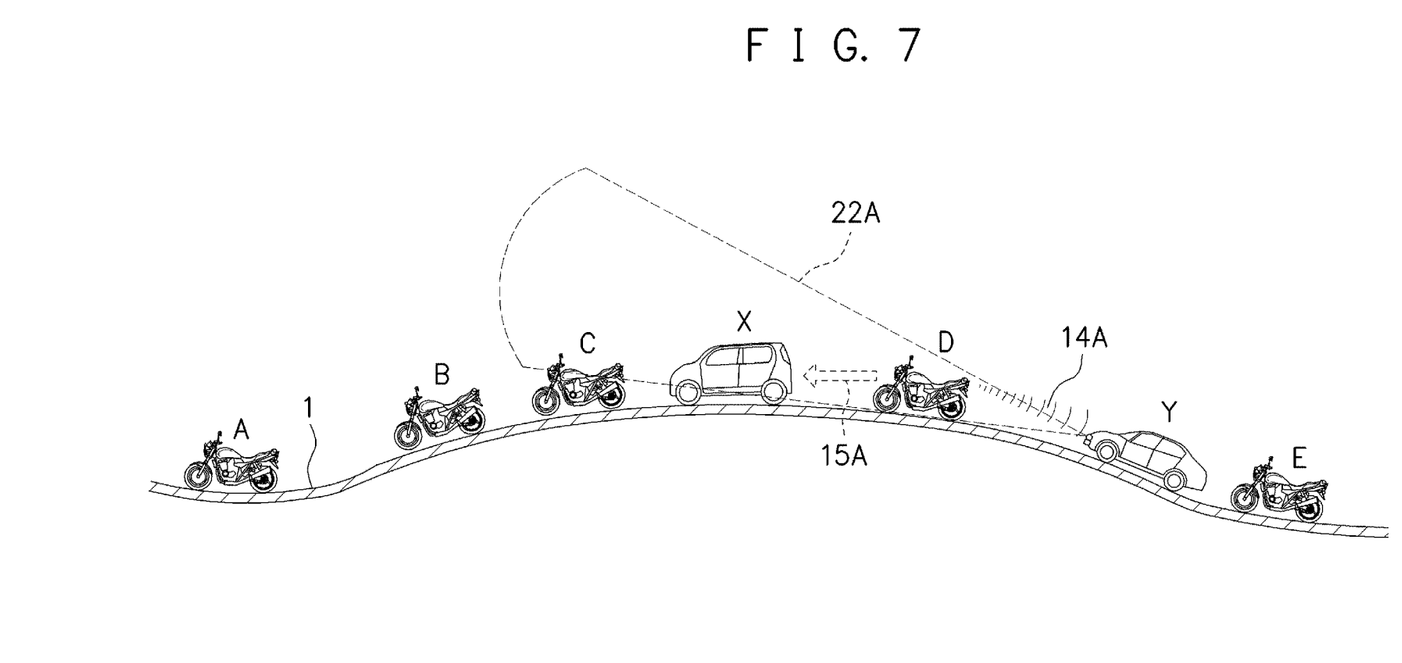
FIG. 7 is a drawing schematically illustrating another exemplary road condition to which the inter-vehicle information sharing system of the present invention is applied.

FIG. 7 indicate a case where the plurality of the motorcycles A to E and the four-wheeled vehicles X, Y are traveling on the road 1 including many slopes of up and down as the illustrated example, and any of the motorcycles A to E enters to the blind spot area of the radar device of each of the four-wheeled vehicles X, Y due to the road 1 including slopes of up and down.

As this example, while the motorcycle D exists in the detection range of the radar wave 22A of the vehicle detection unit of the four-wheeled vehicle Y, the motorcycles A, B, C, and E, other than the motorcycle D, especially, such as the leading motorcycle A are under the condition where it is difficult to be captured by the radar wave 22A. In this case, after the motorcycle D takes an image (taking image 15A) of, for example, the forward four-wheeled vehicle X with the imaging unit of the vehicle detection unit, or after the confirmation of the radar wave 22A irradiated to the motorcycle D from the vehicle detection unit of the four-wheeled vehicle Y, the motorcycle D transmits the group information shared among the motorcycles A to E via the vehicle-to-vehicle communication 14A to the four-wheeled vehicle Y. Then, the group information of the motorcycles A to E is shared by the whole including the four-wheeled vehicle Y existing in the surroundings.

Even under the condition of the road including many slopes of up and down as this example, similarly to the case of the curved road, sharing the information between the group of the motorcycles and the four-wheeled vehicle in accordance with the inter-vehicle information sharing system of the present invention ensures and maintains the mutual high safety.

Other than the conditions of the curved road and the road including many slopes of up and down as described above, for example, at an intersection, the leading vehicle of the group of the motorcycles can provide the information to the four-wheeled vehicle coming into the intersection to inform of the total condition of the group of the motorcycles including the following vehicles.

While the preferred embodiments of the present invention have been described, the present invention is not limited only to the above-described embodiments. Changes and similar modification are possible within the scope of the present invention.

For example, the number of the group of the motorcycles or the number of the four-wheeled vehicles, the positional relationship between the vehicles, and similar factors are not limited to the examples illustrated in such as FIG. 1, and the present invention is applicable to various variations or aspects.

According to the present invention, the motorcycles share the group information, and the group information is provided to the surrounding four-wheeled vehicles to be shared with the four-wheeled vehicles. The motorcycle itself and the surrounding four-wheeled vehicle can obtain the total condition of the group of the motorcycles, thus preventing an unexpected behavior due to lack of information. Sharing the information between the group of the motorcycles and the four-wheeled vehicles ensures and maintains the mutual high safety.

What is claimed is:

1. An inter-vehicle information sharing system where motorcycles in a group action share group information to which each of the motorcycles belongs and the motorcycles share information with a surrounding four-wheeled vehicle via a vehicle-to-vehicle communication, wherein the information to be shared is the group information, wherein information from the motorcycle to the four-wheeled vehicle is transmitted when the four-wheeled vehicle is detected by an imaging unit or an irradiated detection unit included in the motorcycle.

2. The inter-vehicle information sharing system according to claim 1, wherein the four-wheeled vehicle is a vehicle on an automatic operation.

3. The inter-vehicle information sharing system according to claim 1, wherein the motorcycles each share vehicle information of the four-wheeled vehicle.

4. An inter-vehicle information sharing system where motorcycles in a group action share group information to which each of the motorcycles belongs and the motorcycles share information with a surrounding four-wheeled vehicle via a vehicle-to-vehicle communication, wherein the information to be shared is the group information, wherein information from the motorcycle to the four-wheeled vehicle is transmitted when a detection unit irradiated from the four-wheeled vehicle is detected.

5. The inter-vehicle information sharing system according to claim 4, wherein the four-wheeled vehicle is a vehicle on an automatic operation.

6. The inter-vehicle information sharing system according to claim 4, wherein the motorcycles each share vehicle information of the four-wheeled vehicle.

* * * * *